United States Patent
Cheung

(10) Patent No.: US 11,645,952 B2
(45) Date of Patent: May 9, 2023

(54) APPARATUS AND SYSTEM FOR A UNIVERSALLY MOUNTABLE DIGIT-ROLL DISPLAY UNIT

(71) Applicant: Peter W. Cheung, Woodside, NY (US)

(72) Inventor: Peter W. Cheung, Woodside, NY (US)

(73) Assignee: Peter W. Cheung, Woodside, NY (US)

( * ) Notice: Subject to any disclaimer, the term of this patent is extended or adjusted under 35 U.S.C. 154(b) by 906 days.

(21) Appl. No.: 15/269,592

(22) Filed: Sep. 19, 2016

(65) Prior Publication Data

US 2018/0082615 A1  Mar. 22, 2018

(51) Int. Cl.
| | |
|---|---|
| *G06Q 30/00* | (2023.01) |
| *G09F 9/30* | (2006.01) |
| *G06Q 30/0241* | (2023.01) |
| *G06Q 30/0251* | (2023.01) |
| *G09F 9/33* | (2006.01) |
| *G09F 27/00* | (2006.01) |
| *G09F 21/04* | (2006.01) |

(52) U.S. Cl.
CPC ......... *G09F 9/301* (2013.01); *G06Q 30/0265* (2013.01); *G06Q 30/0277* (2013.01); *G09F 9/33* (2013.01); *G09F 21/04* (2013.01); *G09F 27/00* (2013.01); *G09F 27/007* (2013.01)

(58) Field of Classification Search
None
See application file for complete search history.

(56) References Cited

U.S. PATENT DOCUMENTS

| | | | | |
|---|---|---|---|---|
| 3,633,299 | A * | 1/1972 | Westin | G09F 21/042 40/592 |
| 9,229,664 | B2 | 1/2016 | Landa et al. | |
| 9,954,416 | B2 | 4/2018 | Kataoka et al. | |
| 10,981,377 | B2 | 4/2021 | Landa et al. | |
| 2002/0084891 | A1* | 7/2002 | Mankins | B60Q 1/2611 340/425.5 |
| 2008/0030427 | A1* | 2/2008 | Lanham | G06Q 30/02 345/2.3 |
| 2008/0055106 | A1* | 3/2008 | Zhang | G09F 9/33 340/815.45 |
| 2008/0248815 | A1* | 10/2008 | Busch | H04W 4/029 455/456.5 |

(Continued)

FOREIGN PATENT DOCUMENTS

EP   3136223   3/2017

*Primary Examiner* — Michael W Schmucker
(74) *Attorney, Agent, or Firm* — Patent Ventures, LLC

(57) ABSTRACT

The present invention claims and disclose an improved portable, modular, segmental, universally mountable digit-roll display unit with modular, adjustable, expandable, customizable display, and, or members, which could be universally attached to a plurality of surfaces via a variety of combination of attachments. These functions allow for simple, organized, customizable portable digital signage solutions for the individual. All the individual user has to do is to attach or detach the universally mountable digit-roll display unit according to the display surface dimensions. This makes the apparatus ideal for a peer-to-peer, or a marketer-to-contractor network. In addition, it enables marketer to track geo-location and viewer metrics, in order to dynamically push suitable content to display units and to mobile devices of proximal viewers.

12 Claims, 6 Drawing Sheets

(56) References Cited

U.S. PATENT DOCUMENTS

| | | | |
|---|---|---|---|
| 2012/0204455 A1* | 8/2012 | Mothaffar | G09F 13/22 |
| | | | 40/610 |
| 2018/0040192 A1 | 2/2018 | Thomas et al. | |
| 2020/0103891 A1 | 4/2020 | Cella et al. | |

* cited by examiner

APPARATUS AND SYSTEM FOR A UNIVERSALLY MOUNTABLE DIGIT-ROLL DISPLAY UNIT

BACKGROUND

Field of the Invention

The field of the invention relates to a universally attaching digital signage that is roll-able/fold-able and modular. The universally mountable digital signage roll may be attached to a plurality of display surface members and rolled or folded along at least one roll or fold line to form a modular, easy-to-carry portable digital signage for broad or narrow-casting advertising. Specifically, the invention relates to a roll-able digital signage that may be reeled out along a horizontal axis that is disposed within an elongated housing that may be affixed to an exterior or interior of a display surface.

Background of the Related Art

Numerous devices have been previously designed for aiding in visual display purposes. However, few are focused on a vehicle modular advertising system. Few options currently exist on the market, or are disclosed, from back-lit prints, magnetic stickers, scrolling LEDs, etc. These systems all have significant limitations, ranging from: alack of modularity, to alack of an independent power and, or control source. They essentially need to be fitted onto a vehicle, wherein the corresponding vehicle requires a retro-fitting to securely accommodate the display. Additionally, the display units are not modular/foldable and do not provide for a form-factor that is conducive to easy delivery, peer-to-peer exchange, advertiser-to-contractor exchange, and, or convenient stow-away. Moreover, the display units described in the art and, or available in the market, lack a housing, or housings dedicated to delivering power and, or control independent of the display carrier.

One such reference, CA2633579, Nederi, et al., claims and discloses an LCD screen that is encased in a protective casing for external display on vehicle. However, Nederi does not disclose or claim an LCD screen that may be modular capable of being carried from one vehicle to another vehicle, or delivered from one peer to another peer. Additionally, Nederi does not claim or disclose a display that is independent of the carrier, and which is further configured to dynamically update content based on a received data.

Another reference, US20080284983 (Dula) discloses a wall mounted projection for viewing outside of a mobile conveyance. It requires a short-throw projection that is de-coupled from the display screen and is strictly intended for commercial trucks. Due to the de-coupled system and large size of the screen, the Dula device is not portable/modular for peer-to-peer exchange. Moreover, the device is not configured for dynamic content pushing. Other devices disclosed include US20110258895 (Rodgers), U.S. Pat. No. 6,812,851 (Dukach, et al.), and U.S. Pat. No. 7,478,492 (Madonia)—all of which disclose flat panel displays mounted to an exterior portion of the vehicle using an after-market framework or bracing. Such frameworks additionally require fasteners with nuts and bolts in order to secure on the surface of the conveyance. Each have a lack of portability and modularity due to the requirement for a framework or bracing installation. Such mechanisms would not allow for a user to easily affix or remove from one's vehicle. Consequently, such devices would not be conducive for a peer-to-peer or a contractor-to-marketer exchange platform.

These devices also lack versatility of lightweight construction for travel or delivery friendliness. Modular construction of water and weather proof display units that easily interchange to various types of carriers, such as, a tubular case, duffel bag, backpack, would significantly enhance the user friendliness for travel and delivery.

Furthermore, the above mentioned devices are manufactured with unitary material lacking combination materials which may provide additional flexibility for users. Additionally, the display screens are limited to either large wall mounted projections or flat panel displays. Neither of which are screens that are rolled up or down from a roller rotationally disposed within a modular, elongated housing, that may be mounted substantially flush on a conveyance surface. There is need for a universally modular display device, which can be easily affixed onto a conveyance surface without the need for bracing, and which can be easily rolled up into its housing and removed from a conveyance surface for transport or delivery. There is additionally a need for an infrastructure facilitating the exchange of device units and content among contractors and marketers.

SUMMARY

These and other features and improvements of the present application will become apparent to one of ordinary skill in the art upon review of the following detailed description when taken in conjunction with the several drawings and the appended claims. The present invention fills a void left behind by the current art and market. The present invention provides for a digital signage roll—in a modularized, universally integratable form. In one generalized aspect of the invention, an apparatus and system for a universally mountable digital signage is claimed and disclosed. In another generalized aspect of the invention, a system for a universally mountable digital signage community platform is claimed and disclosed.

In one preferred embodiment, the apparatus may comprise a at least one housing member with a roller rotationally disposed within, wherein each terminal end of the roller is affixed to any one of a mechanical or electro-mechanical rotational means, and at least one solar panel attached to at least one surface of the at least one housing member. Any one of roll-able silicone and, or polymer sheet embedded, between, and, or encasing a plurality of programmable light emitting diode strips for causing text, graphical, and, or video display, wherein a partial or entire length of the sheet, in a retracted state, is rolled around the roller, such that the sheet is disposed entirely or substantially within the housing member; the partial or entire length of the sheet extended from the housing member by rotating the roller in a counter directional manner from the retracted state; and the entire width of the sheet extends from one terminal end of the roller to a second terminal end of the roller. The power circuitry composed of any one of, or combination of, 12-volt battery, solar, lithium-ion, AC/DC adapter, USB adapter, disposed within and, or on the surface of the at least one housing member and in operable communication with any one of, or combination of, the first, and, or the second terminal end of the roller to actuate protraction, and, or retraction of the roll-able silicone and, or polymer sheet embedded and, or between a plurality of programmable light emitting diode strips for causing text, graphical display, and, or video display.

Additionally, a control circuit with programmable logic disposed within and, or on the surface of the at least one housing member further comprising any one of, or combination of a parsing layer, a pre-loaded file store, and an interface module in communication with any one of, or combination of the pre-loaded file store, remote server, and, or a user interface for causing retrieval and, or pushing of content in any one of a dynamic, scheduled or static fashion. Also, one or more expansion slots for optional/future add-on modules may be present.

Moreover, at least one affixing element is disposed on any one side of the housing member adapted to be attachable and, or detachable to a plurality of surfaces, wherein the affixing element may be any one of, or combination of, a zipper, adhesive fastener, magnetic fastener, textile fastener, hooks, buttons, suction cups, D-rings, clips, chains, snap-closed rings, sliding snap-closed rings, wrap-around rings, wrap-around flaps, buttoned wrap-around flaps, pneumatic attachment, C-hooks, S-hooks, and, or tie-strings.

In another embodiment, the system may comprise a housing member, any one of a roll-able silicone and, or polymer sheet, a power circuit, a control circuit, at least one affixing element—just as the apparatus above—and at least at least one electronically reconfigurable processor and a non-transitory electronically accessed memory storage element coupled to the said processor, encoded instructions stored in the said storage element, when implemented by the said processor configures the system to: generate an event message based on a client input; serve the event message to the parsing layer for parsing of the pre-loaded file store and, or remote server for a content file corresponding to the client input; request the content file from the pre-loaded file store and, or remote server; retrieval of the content file from the pre-loaded file store and, or remote server; and dynamically push the content file corresponding to the client input to the roll-able silicone and, or polymer sheet embedded, between, and, or encasing a plurality of programmable light emitting diodes.

In yet another embodiment, a contractor-to-marketer network comprises: a server; at least two Internet-coupled devices coupled to the server, each of the Internet devices including: a processor; an interface operatively coupled to the processor and to the server a web server operatively coupled to the processor and operatively coupled via the relay agent to the relay server; and at least one application operably coupled to the processor for effectuating communication with the web server and performing the steps of: inputting and saving information of users in the memory; associating each of one or more users with one or more advertisers in the memory; receiving an advertising request from a requesting advertiser; determining if a user satisfies exposure criteria based on the user input; receiving an advertising request from a requesting advertiser; and if acceptance is confirmed by the requested user, sending the advertising request via the server with instructions for delivery and, or pick-up of to universally mountable digital signage to the requested user device.

It is a further object of the invention to provide an apparatus, system, and platform embedded and, or coupled to a single or a plurality of sensors configured to monitor and sense user's position, movement, and environment, as part of a user context, whereby the organizer adaptively reconfigures based on said user context. The user context further comprises: data input over a network, from any one of, or combination of, a user mobile device, wearable device, home, Internet of Things, user-defined input history, and web automation service, whereby the organizer adaptively reconfigures based on said data. Yet a further object is to provide for universally mountable digital signage further comprising: an electronic detection means operably coupled to said organizer; an interface means for transmitting a data from said electronic detection means to a storage means; a processor for executing instructions stored in memory, wherein when executed, configure the organizer to cause any one of the following: transfer data over a network interface for analytics; actuate a motor; and cause playback of an auditory and or visual cue.

Aspects and advantages of this invention may be realized in other applications, aside from the intended application of vehicle display. Other pertinent applications that may exploit the aspects and advantages of this invention are, but not limited to store-fronts, home-fronts, billboards, building frontage, trucks, vans, trailers, etc.

Other aspects and advantages of the invention will be apparent from the following description and the appended claims.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present inventors have realized that there is a need for an improved portable, modular, segmental, universally mountable digital signage roll with modular, adjustable, expandable, customizable display, and, or members, which could be universally attached to a plurality of surfaces via a variety of combination of attachments. These functions allow for simple, organized, customizable portable digital signage solutions for the individual. All the individual user has to do is to attach or detach the universally mountable digital signage roll according to the display surface dimensions. This makes the apparatus ideal for a peer-to-peer, or a marketer-to-contractor network. In addition, it enables marketers to track geo-location and viewer metrics, in order to dynamically push suitable content to display units and to mobile devices of proximal viewers.

Figure 1:
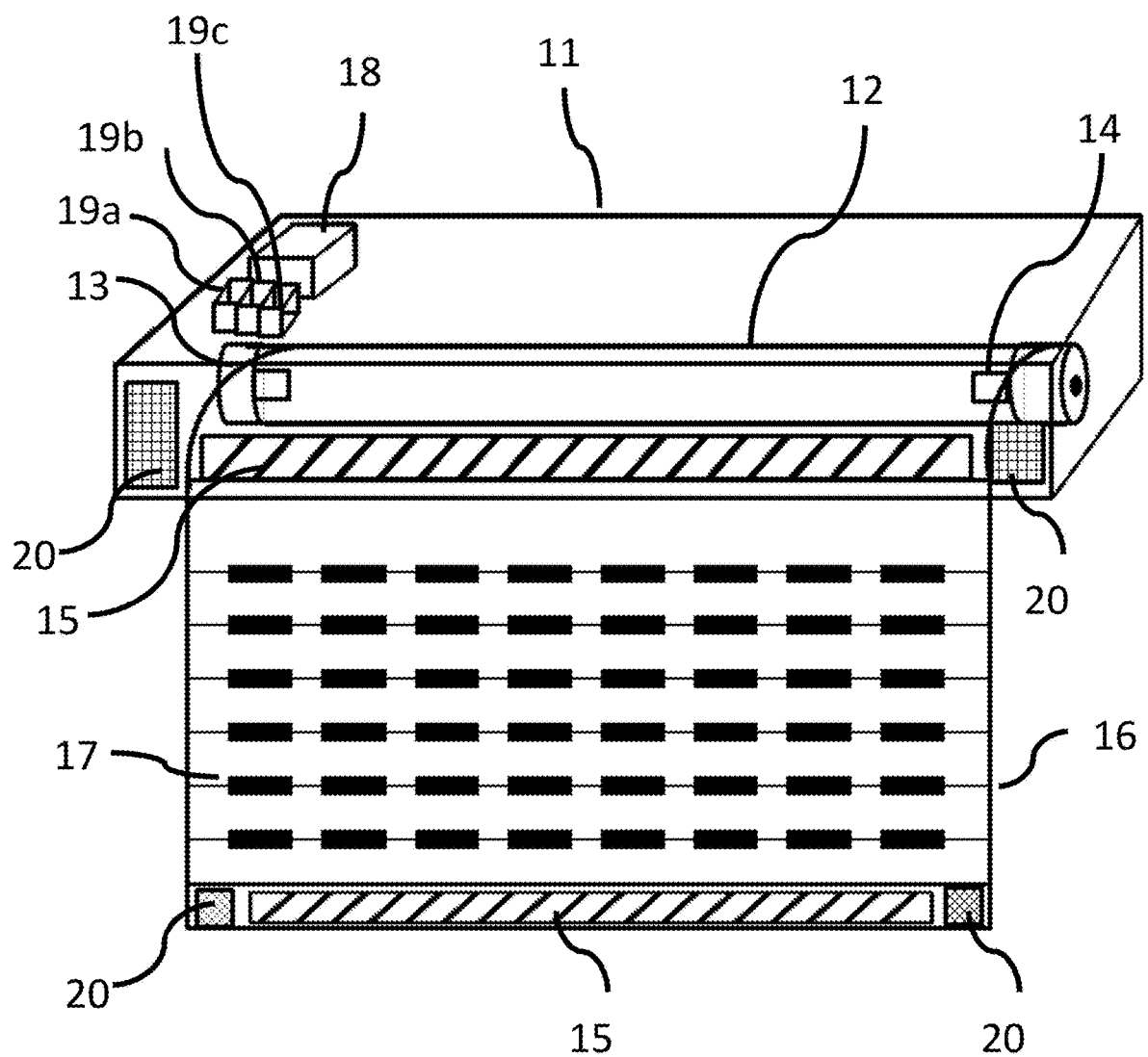
FIG. 1 is a front perspective view diagram of the digital signage roll in accordance with an aspect of the invention.

FIG. 1 illustrates a front perspective view of the present invention according to a preferred embodiment of the invention. A preferred embodiment of the current invention comprises of a at least one housing member 11 with a roller 12 rotationally disposed within, wherein each terminal end 13 of the roller 12 is affixed to any one of a mechanical or electro-mechanical rotational means 14, and at least one solar panel 15 attached to at least one surface of the at least one housing member 11, and, or a pull grip.

Furthermore, any one of roll-able silicone and, or polymer sheet 16 embedded, between, and, or encasing a plurality of programmable light emitting diode strips 17 for causing text, graphical, and, or video display, wherein a partial or entire length of the sheet 16, in a retracted state, is rolled around the roller 12, such that the sheet 16 is disposed entirely or substantially within the housing member 11; the partial or entire length of the sheet 16 extended from the housing member 11 by rotating the roller 12 in a counter directional manner from the retracted state; and the entire width of the sheet 16 extends from one terminal end 13 of the roller 12 to a second terminal end 13 of the roller 12.

Yet further, a power circuitry 18 composed of any one of, or combination of, 12-volt battery, solar, lithium-ion, AC/DC adapter, USB adapter, disposed within and, or on the surface of the at least one housing member 11 and in operable communication with any one of, or combination of, the first, and, or the second terminal end 13 of the roller 12 to actuate protraction, and, or retraction of the roll-able silicone and, or polymer sheet 16 embedded, between, and, or encasing a plurality of programmable light emitting diode 17 strips for causing text, graphical display, and, or video display.

Still yet further, a control circuit 19 with programmable logic disposed within and, or on the surface of the at least one housing member 11 further comprising any one of, or combination of a parsing layer 19a, a pre-loaded file store 19b, and an interface module 19c in communication with any one of, or combination of the pre-loaded file store 19b, remote server, and, or a user interface for causing retrieval and, or pushing of content in any one of a dynamic, scheduled or static fashion.

At least one affixing element 20 disposed on any one side of the housing member 11 adapted to be attachable and, or detachable to a plurality of surfaces, wherein the affixing element 20 may be any one of, or combination of, a zipper, adhesive fastener, magnetic fastener, textile fastener, hooks, buttons, suction cups, D-rings, clips, chains, snap-closed rings, sliding snap-closed rings, wrap-around rings, wrap-around flaps, buttoned wrap-around flaps, pneumatic attachment, C-hooks, S-hooks, micro-suction tape, and, or tie-strings.

In a preferred embodiment of the current invention, the housing member 11, horizontal members and, or vertical members may be provided. Housing member 11 may be rectangular in order for more secure attachment to a flat display surface. Alternatively, the housing member 11 may be tubular in order to better facilitate carriage. For instance, a tubular housing member may be disposed within a tubular can or case affixed with a strap or over-the shoulder-straps for convenient carriage and, or delivery. Rectangular cases may also be affixed with a strap or over-the-shoulder-straps. Case material may be any one of, or combination of, Thermoplastics, and, or Thermosets. Thermoplastics are softened by heat and can be molded. (injection molded, blow molded or vacuum formed). Good examples are acrylic, polypropylene, polystyrene, polythene and PVC. Thermosets are formed by a heat process, but are then set (like concrete) and cannot change shape by reheating. Examples are melamine (kitchen worktops), bakelite (black saucepan handles), polyester and epoxy resins.

Additionally, the housing member 11 may be comprised of a light-weight, pliable material for convenient carriage and to easily affix to a display surface that isn't perfectly planar. The member 11 may also have sufficient tensile strength in order to house the roll-able diode sheet 16 and the various components. Alternatively, a heavy-duty industrial grade, flexible, light-weight polymeric or non-polymeric polyurethane or polyvinyl chloride may be used. Other potential materials for the housing member may comprise acrylic, polypropylene, polystyrene, polythene, PVC, melamine (kitchen worktops), bakelite (black saucepan handles), polyester and epoxy resins.

In some embodiments, the housing member 11, along with the display sheet 16 may be further encased with a waterproof, stain resistant material. For example, a transparent, heavy-duty industrial grade, flexible, light-weight polymeric or non-polymeric polyurethane or poly vinyl chloride, Cordura nylon, Kodra nylon or nylon fabric material may be used. Alternate materials for the encasing may be a transparent plexi-glass material or other analogous material. The encasing, in both instances, would be applied after the display sheet was fully protracted and in the 'full display' state.

In a preferred embodiment of the current invention (not shown), the horizontal housing member 11, vertical housing member 11, and, or display sheets 16 may be attached with each other to form a larger digital signage for larger display surfaces using, but not limited to, a heavy duty or industrial quality fastening mechanism, for example, a push-pin lock, or helical male-female threads, or hooks. Other fastening mechanism may include D-rings, clips, chains, snap-closed ring, sliding snap-closed ring, wrap-around ring, wrap-around flap, buttoned wrap-around flap, c-hook, s-hook. The multi-screen connectors may be disposed on the exposed side of each terminal end of the housing member 11, or may be disposed on any other portion of the exposed side of the housing member 11.

Preferably, the display sheet 16 may be removed from a roller 12 and switched with another display sheet 16. The top margin of a display sheet 16 may further comprise any one of, or a combination of, a fixed or removable hooks, fasteners, fabric fasteners, hook and loop fasteners, suction cups, D-rings, clips, chains, snap-closed ring, sliding snap-closed ring, wrap-around ring, wrap-around flap, buttoned wrap-around flap, c-hook, s-hook and or a tie-string for attaching to the roller 12.

Furthermore, in another preferred embodiment of the present invention, a plurality of modular adjustable, expandable, and, or customizable components may constitute the housing member 11 (not shown). Such additional modularity allows for a user to have additional ease of storage, carriage, and delivery. The components may attach in a similar fashion as the housing members connected in series to form the larger digital signage roll, as disclosed above. In alternative embodiments, the customizable components may be of different shapes and sizes and are customizable to a user's preference.

Furthermore, storage compartments (not shown) may be fitted onto the back-panel frame or interior-facing surface of the housing member. The storage compartment makes for easy accessibility of the material stored in the compartment. Further, multiple sectionalized compartments and, or a deep top open compartment may be fitted to store, for example, but not limited to, bottles, toys, cups, make up, make up brushes, make up bottles, vanity products, as well as toiletries etc. The storage member compartments may be attached to the back-panel frame or interior-facing surface of the housing member by using, any one of or a combination of, but not limited to, a heavy-duty double sided tape, magnetic strip and or fabric hook and a loop fastener such as, Velcro, to form a strong enough bond between the storage member compartments and the back-panel frame or interior-facing surface of the housing member.

In continuing reference to the housing member 11, at least a single solar panel, or a series of panels may be disposed on the front-panel surface of the housing member 11. Such a surface putatively receives the most sun exposure given that it is on the same plane as the display sheet 16 and fully exposed. In the vertical housing member configuration, solar panel or solar panels may be disposed on a single housing member 11, or on both members 11. The panels may further be in operable communication with the control circuit 19 and, or power circuit 18. Such power may be used to supplement the other on-board sources, or may be the exclusive source of power. Such power may be used for actuating the electro-mechanical rotational means at each terminal end 13 of the housing member 11. Such actuation results in the protraction and retraction of the display sheet 16. Moreover, sources of power may be necessary for utilizing other features, such as powering the diodes, pushing content, pushing content dynamically, etc.

Furthermore, the housing member may be disposed with a control circuit 19. The control circuit 19 may further comprise a parsing layer 19*a*, a pre-loaded file store 19*b*, and an interface module 19*c*. In a preferred embodiment, the control circuit 19 with programmable logic disposed within and, or on the surface of the at least one housing member 11 is further comprised any one of, or combination of a parsing layer 19*a*, a pre-loaded file store 19*b*, and an interface module 19*c* in communication with any one of, or combination of the pre-loaded file store 19*b*, remote server 19*b*, and, or a user interface module 19*c* for causing retrieval and, or pushing of content in any one of a dynamic, scheduled or static fashion.

The parsing layer 19*a* may be configured to receive request messages from a user input on-board or remotely, and, or from a remote server via the interface module 19*c* and retrieve the requested content from the pre-loaded file store 19*b*. Alternatively, request messages generated dynamically based on a user input and, or from contextual data may cause the parsing layer 19*a* via the interface module 19*c* to retrieve the requested content from the pre-loaded file store 19*b*. User input may be prompted answers and, or user volunteered answers. User input may also be user-specific usage data or user behavior. Additionally, user input may be based on contextual data derived from a user mobile device and, or wearable device. Moreover, user input may further encompass any one of, or combination of travel destination, travel distance, out-board vehicular, craft sensor data, travel conditions, and, or landscape data.

Such user input generates an event message The event message may then be served to the parsing layer 19*a* for parsing of the pre-loaded file store 19*b* for a content file corresponding to the requested input embedded in the event message. Alternatively, parsing of the file store 19*b* may be achieved by a file layer (not shown) within the parsing layer 19*a*. The parsing layer 19*a* may also comprise of a meta layer (not shown) to parse the file store 19*b* to retrieve metadata tags corresponding to the requested input embedded in the event message.

Alternatively, if the pre-loaded file store 19*b* does not contain the requested content, the parsing layer may 19*a* seek the requested content from a remote server via the interface module 19*c*. Once the requested content is retrieved by the parsing layer 19*a*, the loaded fie store 19*b* may be updated to reflect the recently requested and retrieved content. In other embodiments, the loaded file store 19*b* does not update the local cache of the loaded file store 19*b*. Additionally, the parsing layer 19*a* may broadcast the content onto the display sheet 16 for visual and, or audible display. Alternatively, the parsing layer 19*b* may further be in operable communication with a display module (not shown) that broadcasts the content onto the display sheet 16 for visual and, or audible display.

In a preferred embodiment, the interface module 19*c* may be in communication with any one of, or combination of the pre-loaded file store 19*a*, and, or remote server 19*b* for causing retrieval and, or pushing of content in any one of a dynamic, scheduled or static fashion. The network disclosed in this application describes and encompasses the full range of network classes: PAN, LAN, NAN, and WAN. The standard PAN shortwave radio technology used to communicate a digital display roll with a hand-held device are Bluetooth, NFC, ZigBee, 6LoWPAN, Z-wave, ANT, DECT ULE, etc. The standard LAN is the Wi-Fi based on the IEEE 802.11 standard. Finally, the standards WAN used for the external network is 2G, 3G, 4G, and WiMAX.

The network may be any other type of network that is capable of transmitting or receiving data to/from host computers, personal devices, telephones, video/image capturing devices, video/image servers, or any other electronic devices—capable of transmitting/sending data between the mentioned devices. The network may be a local, regional, or global communication network. The network may include any software, hardware, or computer applications that can provide a medium to exchange signals or data in any of the formats known in the art, related art, or developed later.

Figure 2A:
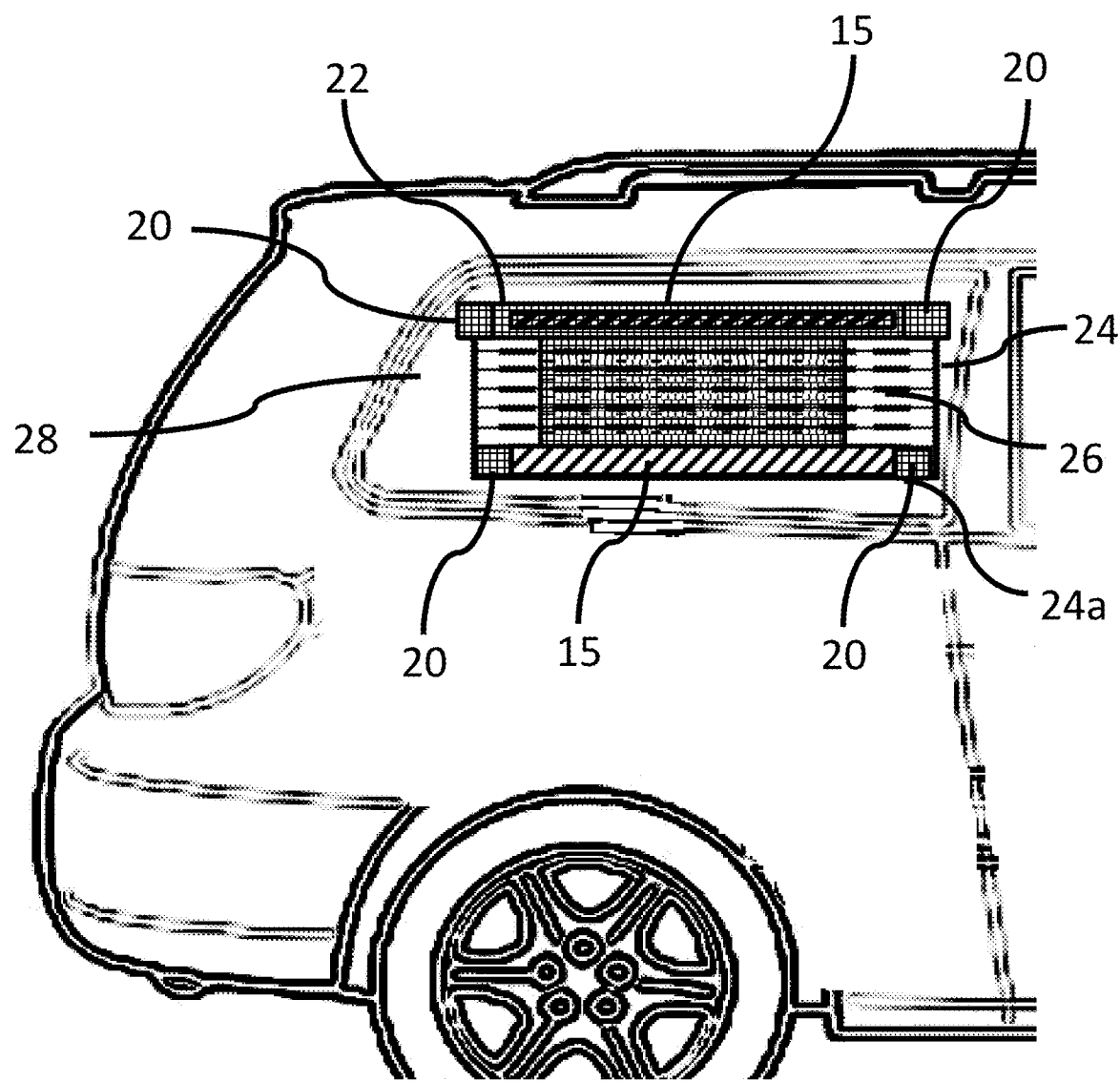
FIG. 2a is a front perspective diagram of the digital signage affixed to a display surface in accordance with an aspect of the invention.
Figure 2B:
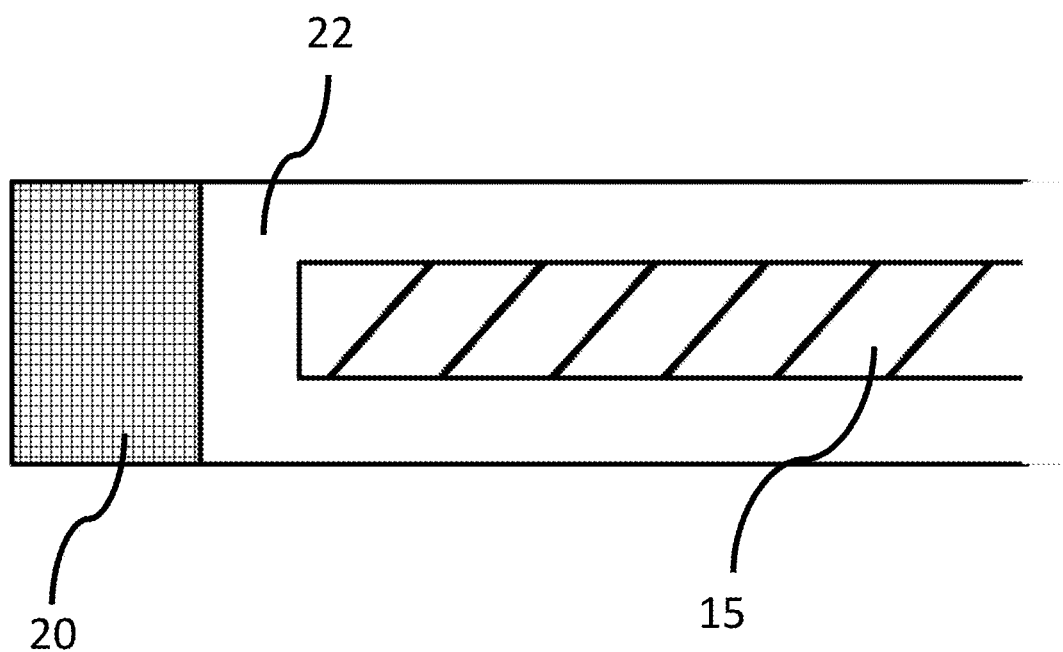
FIG. 2b is a fragmentary sectional view of the affixing element of the digital signage roll in accordance with an aspect of the invention.

FIG. 2*a* illustrates a front perspective view of the digital display roll mounted onto a display surface in accordance with an aspect of the invention. The portable, modular display-roll with a housing member 22, disposed with an affixing element 20 is shown for illustrative purposes. FIG. 2*b* illustrates a fragmentary sectional view of a portion of the affixing element 20 disposed on the viewer-side surface of the housing member 22.

In an embodiment of the present invention, fastening of the digital display-roll into a display surface 28 may be achieved by an affixing element 20, which may be comprised of, but not limited to, a zipper, adhesive fastener, magnetic fastener, textile fastener, hooks, buttons, suction cups, D-rings, clips, chains, snap-closed rings, sliding snap-closed rings, wrap-around rings, wrap-around flaps, buttoned wrap-around flaps, pneumatic attachment, C-hooks, S-hooks, and, or tie-strings, double-side tape, fabric fastener, an industrial quality zipper, magnetic strips, Velcro, snap attachments, etc. In an alternative embodiment, the housing member 22 viewer-side surface may be affixed onto a display surface 28 by hooking or attaching onto a pre-existing after-market tool on a display surface 28 complementing the affixing element 20. In yet other embodiments, the complementary pre-existing tool may be a factory or contractor-issued tool—as part of the display manufacturing or construction—which complements the affixing element 20 in order for the digital display-roll to be securely mounted onto a display surface 28.

As FIG. 2a illustrates, in a preferred embodiment, the digital display-roll may be securely mounted onto a vehicle window. The vehicle may be any one of a car, van, truck, bus, marine vessel, and, or low-flying aircraft. In this example, the display surface 28 may comprise any one of, or combination of, the interior glass surface, exterior glass surface, interior c-column panel frame, exterior c-column panel frame, interior b-column panel frame, exterior b-column panel frame, interior b-column panel frame, exterior a-column panel frame, interior a-column panel frame, interior top-portion of a vehicle door, exterior top portion of a vehicle door, interior roof panel, and, or interior roof panel.

In other examples, the digital display-roll may be securely mounted onto a vehicle side, and, or rear panels. The vehicle may be any one of a car, van, truck, bus, marine vessel, and, or low-flying aircraft. In this particular embodiment, the display surface 28 may comprise any one of, or combination of, the side doors, wheel wells, side bumper, rear fascia, trunk, rear bumper, side panels, and, or rear panel.

In yet other examples, the digital display-roll may be securely mounted onto a store-front window and, or entrance. In such cases, the affixing element 20 may be mounted to the glass display surface, panel, and, or frame surrounding the glass display surface. Similarly, the affixing element 20 may be mounted to entrance door display surface, panel, and, or frame surrounding the entrance door display surface.

Still in reference to the display surface 28, another example of a display surface 28 may be a facade of a building, and, or home. For instance, the affixing element 20 may be securely mounted onto any one of facade-clad such as, mortar, pointing, brick, stone, stucco, panel, and, or a pre-existing and, or construction-fitted implements that are complementary to the affixing element 20.

Now in reference to the display sheet 24 of FIG. 2a, any one of roll-able, transparent silicone and, or polymer sheet may be embedded, between, and, or encase a plurality of programmable light emitting diode strips 26 for causing text, graphical, and, or video display. The epoxy lens or case encasing each diode or photon-releasing light source may be oriented in equidistant columnar rows. In a preferred embodiment, the columnar rows of epoxy encasing also have sufficient space between columns and rows in order to be sufficiently visible through the transparent display sheet 24 from within a display housing, i.e., vehicle, store, etc. In other embodiments, the matrix of light emitting diodes 26 may be housed in a transparent epoxy housing and flat spot which allows for sufficient visibility from within a display housing. Such a transparent epoxy housing and flat spot may allow for a matrix of an increasing number of diodes 26, without compromising driver, passenger, store-owner, and, or patron visibility.

Any one of a semiconductor material for a diode may be used—from silicon to germanium—that emit photons in the visible spectrum. Additionally, any one of, or combination of, a color-dedicated light-emitting diodes, and, or Red-Green-Blue light-emitting diode may be used for the matrix on, between, and, or encased in the display sheet 24. Quantum dot light-emitting diodes and, or Organic light-emitting diodes may be used as part of the matrix due to their miniaturized form factor, along with their pliability. The display sheet 24 may additionally be encased in a protective casing to protect the light-emitting diodes 26 from the more extreme weather elements.

Still in reference to the display sheet 24, in some embodiments, the lower portion of the display sheet 24 may have a narrow pull grip 24a running the entire width of the display sheet. The pull grip may also have at least one solar panel attached. Such a pull grip 24a may be for increasing convenience in protracting the display sheet 24 manually from the housing member, as opposed to electro-based protraction. In other embodiments where the housing member configuration is single-vertical, then the pull grip 24a may be on the marginal edge running the non-housing member, length-side of the display sheet 24. In double-vertical housing member configurations, the pull grip 24a may lie on any one of, or both top and bottom edges of the display sheet 24. In yet other embodiments, regardless of the housing member configurations, no pull grip 24a may exist.

The partial or entire length of the display sheet 24, in a retracted state, is rolled around the roller, such that the display sheet 24 is disposed entirely or substantially within the housing member 22. The partial or entire length of the display sheet 24 may be extended from the housing member 22 by rotating the roller in a counter directional manner from the retracted state; and the entire width of the display sheet 24 extends from one terminal end of the roller to a second terminal end of the roller. Rotation may be achieved manually by pulling on the pull grip 24a, and, or by electro-based rotational means coupled to at least one terminal end of the roller.

While not shown in FIG. 2a or 2b, any one of, or combination of, a top panel, rear panel, and, or side panel frames of the housing member may be disposed with a storage compartment—modular, adjustable, and expandable. The storage member compartments may be of different shapes and sizes. The storage compartments may be, any one of or a combination of, hidden, visible and or netted. Other compartments may be grouped with others, or may be individual. Furthermore, the storage compartments may be, but not limited to be composed of any one of, or a combination of, expandable (polyvinyl, polyethylene, spandex, nylon, spandex/nylon, etc.) or non-expandable and firm material—matching the material of any one of the top panel, rear panel, and, or side panel frames.

In continuing reference to the storage compartments (not shown), the compartments may be dimensioned to fit standard objects befitting vehicular travel. For instance, compartments may be dimensioned to accommodate standard juvenile products, i.e., baby bottles, wipes, diapers, toys, etc.

While, also not shown in FIG. 2a or 2b, an organizer may be provided for more easily transporting or delivering the digital display-roll. In accordance with one aspect of the organizer, a back-pack or tote-bag may be provided. In a preferred embodiment, a top wall of the bag or case is disposed with handle for portable carry. The front or rear wall may open by way of zipper, fastener, buttons, and expose the digital display-roll. Other embodiments may include a tubular case for storage, transport, and, or delivery of the digital display-roll. In yet other embodiments, the handle may be disposed directly on the top wall of the housing member and, or straps may be affixed to any one of the terminal ends of the housing member; allowing for transport and, or delivery of the digital display-roll without needing a bag and, or case.

Figure 3:
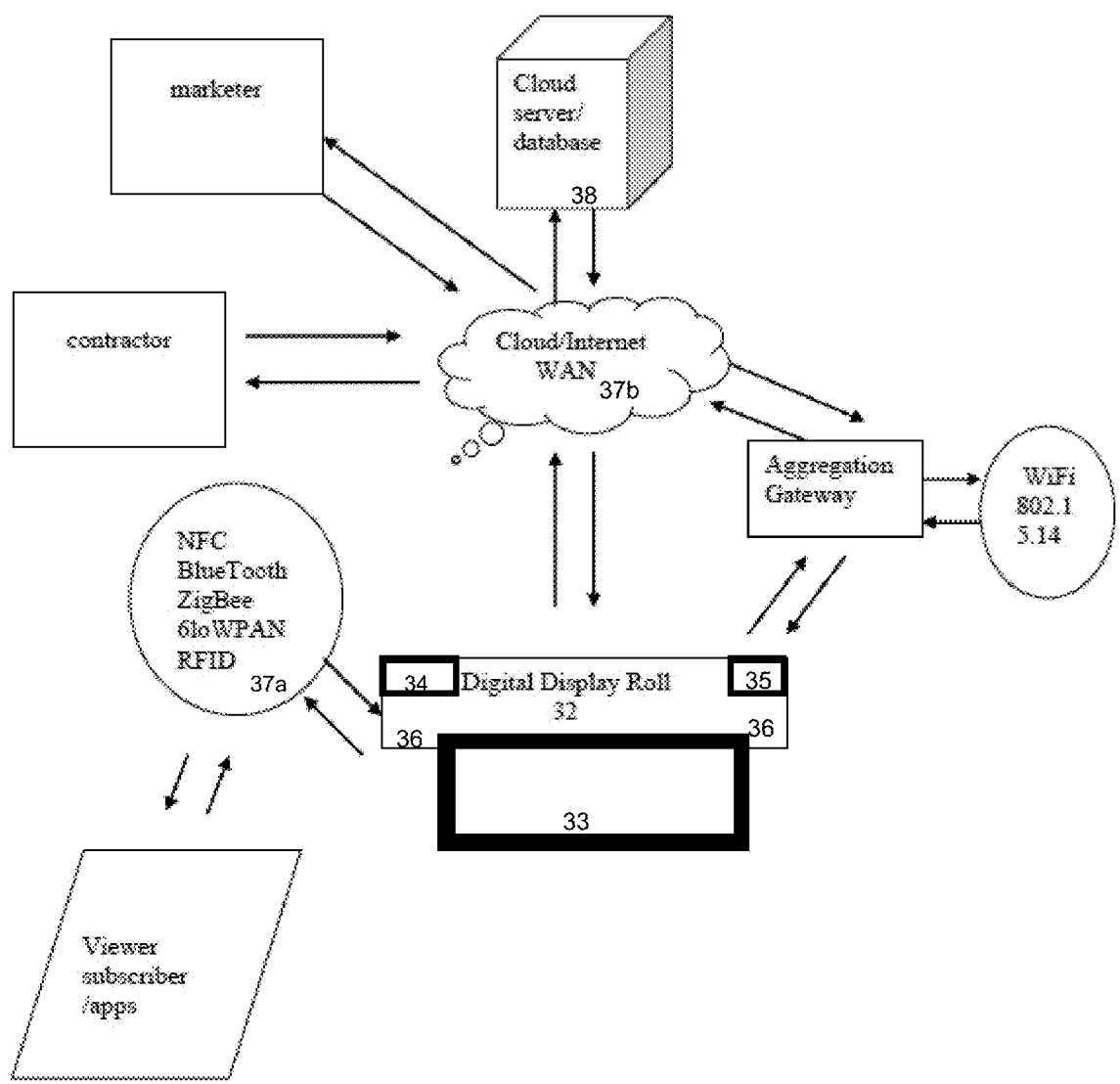
FIG. 3 is a system diagram in accordance with an aspect of the invention.

Now in reference to FIG. 3, illustrated is a system block diagram of the digital display-roll system in accordance with an aspect of the invention. The system may comprise a housing member 32 with a roller rotationally disposed within, wherein each terminal end of the roller is affixed to any one of a mechanical or electro-mechanical rotational means; any one of roll-able, transparent silicone and, or polymer sheet 33 embedded with a plurality of programmable light emitting diode strips for causing text, and, or graphical display, wherein a partial or entire length of the sheet 33, in a retracted state, is rolled around the roller, such that the sheet 33 is disposed entirely or substantially within the housing member 32. The partial or entire length of the sheet 33 may be extended from the housing member 32 by rotating the roller in a counter directional manner from the retracted state; and the entire width of the sheet 33 may extend from one terminal end of the roller to a second terminal end of the roller.

The housing member 32 may further comprise a power circuitry 34 composed of any one of, or combination of, 12-volt battery, solar, lithium-ion, AC/DC adapter, USB adapter, disposed within the housing member and in operable communication with any one of, or combination of, the first, and, or the second terminal end of the roller to actuate protraction, and, or retraction of the roll-able silicone and, or polymer sheet embedded with the plurality of programmable light emitting diodes for causing text, and, or graphical display. Moreover, the housing member 32 may further comprise a control circuit 35 with programmable logic disposed within the housing member 32 further comprising any one of a parsing layer, a pre-loaded file store, and an interface module in communication with the pre-loaded file store and, or a remote server, and, or a user interface for causing retrieval and, or pushing of content in any one of a dynamic, scheduled or static fashion.

At least one affixing element 36 may be disposed on any one side of the housing member adapted to be attachable and, or detachable to a plurality of surfaces, wherein the affixing element 36 may be any one of, or combination of, a zipper, adhesive fastener, magnetic fastener, textile fastener, hooks, buttons, suction cups, D-rings, clips, chains, snap-closed rings, sliding snap-closed rings, wrap-around rings, wrap-around flaps, buttoned wrap-around flaps, pneumatic attachment, C-hooks, S-hooks, and, or tie-strings.

Furthermore, the system may further comprise at least one electronically reconfigurable processor and a non-transitory electronically accessed memory storage element (within the control circuit 35, or otherwise) coupled to the processor, encoded instructions stored in the said storage element, when implemented by the processor configures the said system to: generate an event message based on a client input; serve the event message to the parsing layer for parsing of the pre-loaded file store and, or remote server 38 for a content file corresponding to the client input; request the content file from the pre-loaded file store and, or remote server 38; retrieval of the content file from the pre-loaded file store and, or remote server 38; and dynamically push the content file corresponding to the client input to the roll-able silicone and, or polymer sheet 33 between, embedded, and, or encasing the plurality of programmable light emitting diodes.

The system may further comprise a network 37 encompassing the full range of network classes: PAN, LAN, NAN, and WAN. The standard PAN shortwave radio technology used to communicate a digital display roll with a hand-held device are Bluetooth, NFC, ZigBee, 6LoWPAN, Z-wave, ANT, DECT ULE, etc. The standard LAN is the Wi-Fi based on the IEEE 802.11 standard. Finally, the standards WAN used for the external network is 2G, 3G, 4G, and WiMAX. The network 37 may be any other type of network 37 that is capable of transmitting or receiving data to/from host computers, personal devices, telephones, video/image capturing devices, video/image servers, or any other electronic devices—capable of transmitting/sending data between the mentioned devices. The network 37 may be a local, regional, or global communication network. The network 37 may include any software, hardware, or computer applications that can provide a medium to exchange signals or data in any of the formats known in the art, related art, or developed later.

Figure 4:
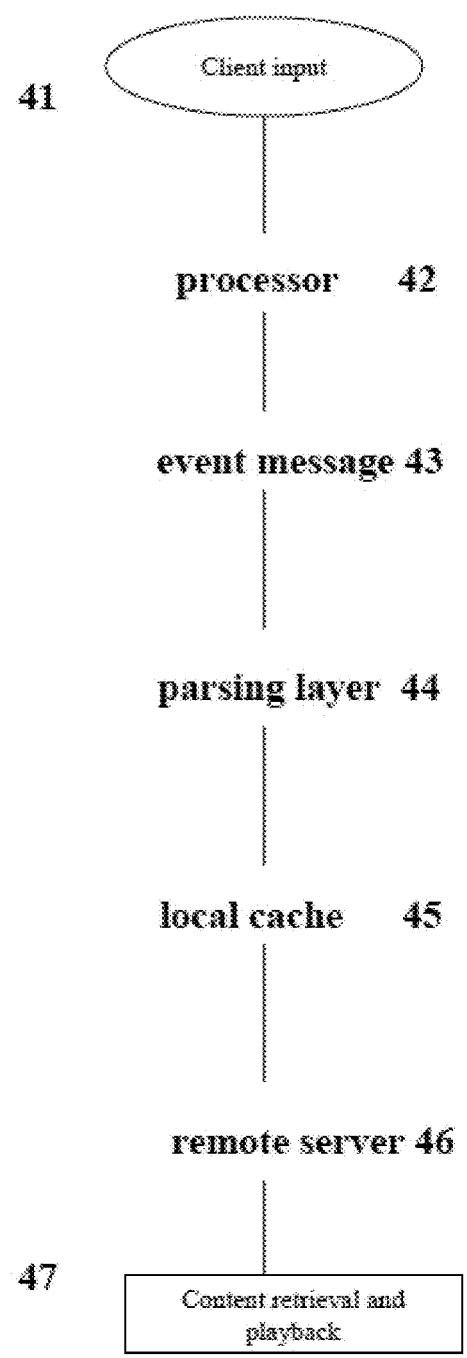
FIG. 4 is a process flow diagram of the system in accordance with an aspect of the invention.

FIG. 4 illustrates a process flow diagram of the generation of an event message in accordance with an aspect of the system. In a preferred embodiment, the reconfigurable processor 42—as part of any one of the interface module, control circuit 35, and, or as a stand-alone module—may generate an event message 43 based on the client requested content input and, or other client input 41. In a preferred embodiment, client input 41 may be prompted answers and, or client volunteered answers. Client input 41 may also be user-specific usage data or user behavior. Additionally, client input 41 may be based on contextual data derived from a user mobile device and, or wearable device. Moreover, client input 41 may further encompass any one of, or combination of travel destination, travel distance, out-board vehicular, craft sensor data, travel conditions, and, or landscape data. In yet other embodiments, contextually driven information of the client geo-location, physiological parameters, social media status, and, or any other sensor-driven information may inform the client input 41 and the event message 43.

The event message may then be served to the parsing layer 44 for parsing of the pre-loaded file store 45 for a content file corresponding to the client input 41. In some embodiments, the parsing layer 44 may also further comprise a meta layer and, or tag layer to parse the file store 45 to retrieve metadata tags and, or corresponding content tags. Alternatively, parsing of the metadata and, or content tags may be achieved by just the parsing layer 44; request the content file from the pre-loaded file store 45. In some embodiments, if the content file is not found in the pre-loaded file store 45, then the parsing layer 44 will search through at least one remote server database 46 for the client requested content file via the interface module of the control circuit 35. Once retrieval is confirmed, the content file is served to the display sheet 33 via the interface module of the control circuit 35.

In some embodiments, the event message may dictate the content file request and is based on anyone of a client input 41. In a preferred embodiment, the client input 41 encompasses a client requested content input corresponding to a requested content title, and, or at least one additional prompted or volunteered answer related to the content request and, or user behavior. Alternatively, the client input 41 may be derived from a system that further comprises at least one embedded housing member, wearable, outboard and, or inboard sensor for capturing client input data; an interface means for transmitting the data from said sensor to a server, storage and or processor means; and based on the data, generates an event message 43 to push suggestions of content to any one of, or combination of, a control circuit 35, display sheet 33, and, or user device.

In some embodiments, the client input 41 may further include any one of a travel itinerary detail and, or any one of a past, current, and, or future geo-location; a single or a plurality of sensors embedded within a wearable, craft, and, or housing member of the digital display roll may be configured to monitor and sense user's position, movement, and environment, as part of a user context, whereby the display sheet and, or user device content adaptively reconfigures based on said user context. In this particular embodiment, a user context may further comprise data input over a network, from any one of, or combination of, a user mobile device, wearable device, home Internet of Things, user-defined input history, and web automation service, whereby the digital signage adaptively reconfigures based on said data.

Although not shown in FIG. 4, the system may further comprise an electronic detection means that may be operably coupled to the digital display roll; an interface means for transmitting a data from the electronic detection means to a storage means; a processor for executing instructions stored in memory, wherein when executed, configure the digital signage to cause any one of, or combination of, transfer data over a network interface for analytics; actuate a motor; and cause playback of an auditory and or visual cue. For instance, one scenario may call for a municipality to issue an emergency alert to all drivers within a certain traffic zone. However, certain traffic zones may not include for a billboard-style digital signage, therefore making service announcements to active display rolls within such zones, a municipal imperative. Emergency alerts may comprise any one of, or combination of, a web feed, text crawl, email, instant message, video data, or audio data.

In a preferred embodiment, the system may also comprise a housing disposed with any one of a short-range communication protocol reader and, or subscriber detection module configured to detect a proximally subscribing viewer device and to push content, loyalty and, or reward points to the viewer device. Suppose a driver with a digital display roll mounted drove past a subscribing person, who was proximally close to the vehicle, the subscriber detection and short-range communication protocol reader would detect such subscriber and push targeted content to the subscriber's device. The targeted content may be more detailed description of alerts, news feeds, sale offers, product description, loyalty offers, reward offers, store locations, etc.

Still referring to the short-range communication protocol reader and, or subscriber detection module, one or more targeted content to the one or more corresponding interfaces for display (display sheet or viewer device) are personalized to the subscriber or participant of an event based on specific markers captured by a RFID-tagged device (or any short-range tagged device) and sensed by the short-range communication protocol reader and, or subscriber detection module embedded in the housing member. In other embodiments, the one or more targeted content to the one or more corresponding interfaces or display are relevant to a group of subscribers or participants of an event based on an aggregate of specific markers captured by each RFID-tagged device (or any short-range tagged device) and sensed by the digital display interface sensor.

The universally mountable digital signage system may be further disposed with a module comprising of any one of, or combination of, speaker and, or microphone. The speaker may allow for content to be audible, in addition to being viewed. Moreover, the microphone allows for the driver or contractor to communicate with the system using semantic language. In some embodiments, a voice activation module may be in communication with any one of, or combination of, the speaker and microphone disposed on the housing member, and, or a microphone coupled to a mobile device interface, allowing for users to make semantic-based, natural language vocal queries and, or commands.

While also not shown in FIG. 4, the system may include a plurality of proxy servers integrated as part of a single deployment communicating with heterogeneous networked-display devices over short-range or wide-area networks. In other embodiments, also not shown, a periphery-server may be integrated as part of the more distributive network architecture, operably connected by a WAN with the proxy server or plurality of proxy servers. In this more distributive network architecture, the periphery server may have larger cache content, allowing users to access a larger repertoire of content. In yet other alternative embodiments, the distributive network architecture may comprise of a plurality of periphery servers, all in operable communication by WAN to any one of a single or plurality of proxy servers deployed. In some embodiments, an Access Gateway that communicates bi-directionally over longer-range networks (Wi-Fi, etc.) may be embedded within the housing member of the digital display-roll. The Access Gateway may serve as a WAN "hotspot" allowing users to access the periphery servers or other URL's for content delivery. Other embodiments include a distributive network architecture further comprising the use of a cloud system, which stores and dynamically delivers context-aware digital content for the de-centralized or networked digit-roll display units.

Figure 5:
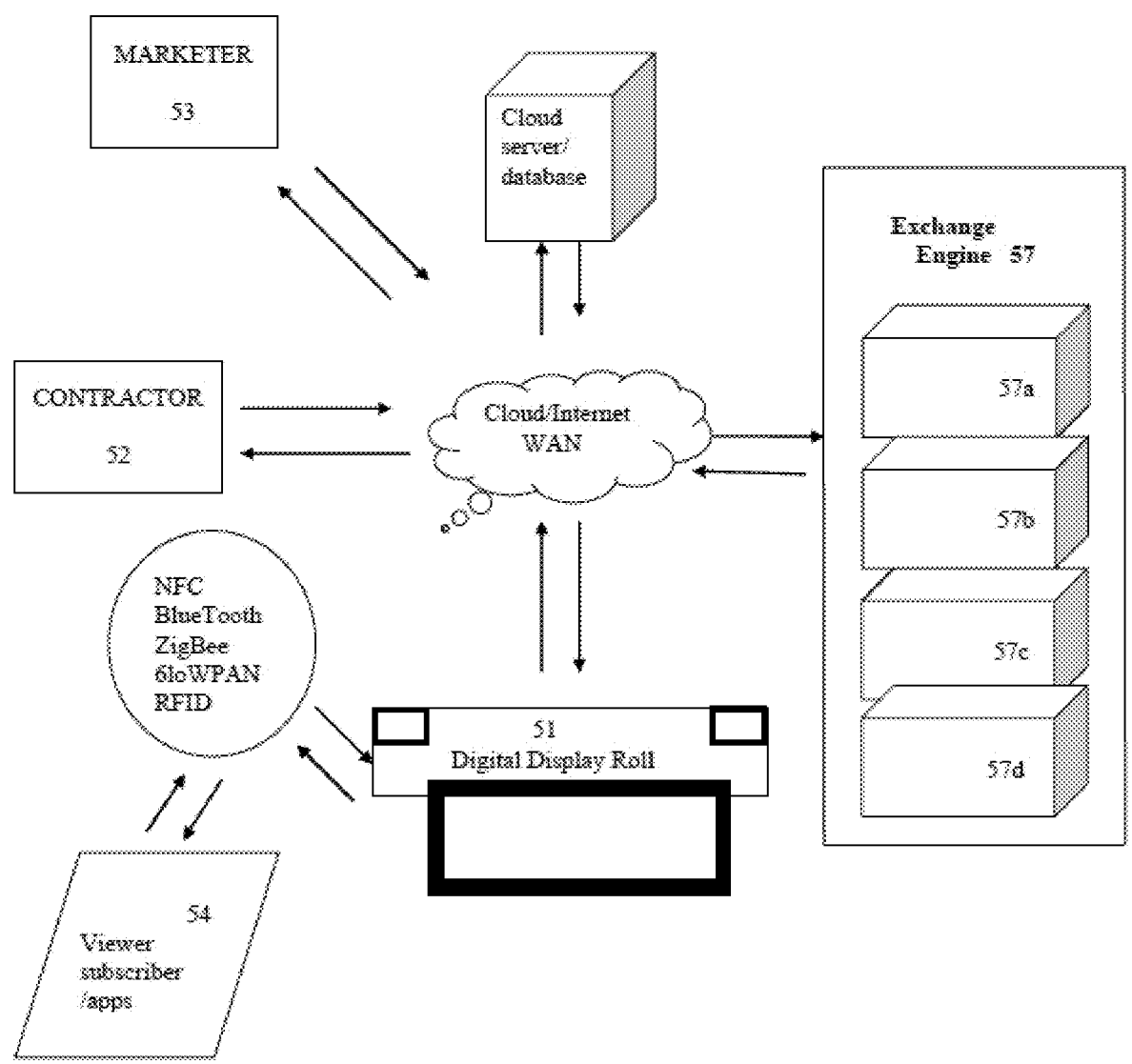
FIG. 5 is a system diagram of the platform in accordance with an aspect of the invention.

FIG. 5 illustrates a system diagram of the digital display platform. A system including the universally mountable digit-roll display unit, further comprising: at least one electronically reconfigurable processor and a non-transitory electronically accessed memory storage element coupled to the said processor, encoded instructions stored in the said storage element, when implemented by the said processor configures the said system to: generate an event message based on a client input; serve the event message to the parsing layer for parsing of the pre-loaded file store and, or remote server for a content file corresponding to the client input; request the content file from the pre-loaded file store and, or remote server; retrieval of the content file from the pre-loaded file store and, or remote server; and dynamically push the content file corresponding to the client input to the universally mountable digital roll display; and a contractor-to-marketer network further comprising: a server; at least two Internet-coupled devices coupled to the server, each of the Internet devices including: a processor; an interface operatively coupled to the processor and to the server; a web server operatively coupled to the processor and operatively coupled via the relay agent to the relay server; and at least one application operably coupled to the processor for effectuating communication with a matching module within a marketing exchange engine and performing the steps of: inputting and saving information of a contractor in the memory; associating each of one or more contractors with one or more marketers in the memory; receiving a marketing request from a requesting marketer; determining if a contractor satisfies exposure criteria based on the user input; geo-tracking and meta-data searching, receiving a marketing request from a requesting marketer; and if acceptance is confirmed by the requested contractor, sending the marketing request via the server with instructions for delivery and, or pick-up of the universally mountable digital signage to a requested contractor device.

In a preferred embodiment, the marketer-to-contractor exchange platform or digital roll display marketing exchange platform (DRMEP) is a peer-2-peer platform that may be cloud-based and, or fee-based. As FIG. 5 shows, at the periphery may be an exchange engine 57 that matches marketers 53 with contractors 52 to engage in the delivery/display of digital marketing contents in exchange for a fixed or variable fee. It consists of several components; one of which matches the prospective contractors with marketers by a matching module 57a within the exchange engine 57. The tracking module 57b may be tasked with tracking customer conversion & attribution. The analytic module 57c provides marketer with detail information pertaining to the outcome, metric, and attribution of their campaign. Finally, the fee module 57d may be the component responsible for performance/compensation computation. Combined with the Digit-Roll Display Unit (DRDU) 51 & web-based, desktop, or mobile application, it provides businesses with a powerful marketing tool that maximizes their public exposure and presence. Alternatively, the contractor-to-marketer exchange platform may exist without the need for any one of, or combination of, a tracking module 57b, analytical module 57c, and, or fee module 57d. In such an alternative embodiment, the contractor may post an input that gets archived and tag indexed, whereby a marketer may match marketer request with tag index of contractor post by matching rules operated by the matching module 57a. Upon satisfaction of a match threshold, marketer can utilize the platform to initiate contact with the contractor for the advertising/content display needs and fee negotiation. Fee arrangements may be coordinated by the contractor and marketer, without the intervention of a $3^{rd}$ party automated vendor, or by the exchange platform fee module 57d. Moreover, tracking and other metrics may be analyzed by sources non-native to the exchange platform.

Still in reference to FIG. 5, exemplary embodiments of the exchange platform may comprise a tracking module 57b, analytical module 57c, and fee module 57d operably engaged to any one of, or combination of the matching module 57a, network 55, additional databases, remote servers, and, or cloud-based storage and processor means. In an exemplary embodiment, the tracking module 57b may track the contractor or prospect's digital-roll display (DRDU) information during the data-gathering period and contractor during the campaign period. Additionally, it may also track the customer conversion and attribution data during the campaign. Prospect data may be sent to the matching module 57a. Together with meta-data search performed by the platform for relevant demographic data, the module will match the prospect with the appropriate marketer. Campaign related data may be passed to the analytical module 57c for informing the module to make all relevant analytics and provisioning.

Preferably, the analytics and provisioning of the analytical module 57c may comprise receiving all relevant tracking data of the contracted DRDU such as date/time, location, ad attribution, customer conversion, etc. Moreover, customer conversion/attribution data are passed along to the DRMEP when an online or walk-in service or sale resulted from the campaign (through the use of contractor ID, DRDU Mac address, bar code, QR code, etc.). What's more, a detailed analytic report may be provided to the marketers so that they can determine the cost effectiveness and success of their campaigns, and adapt future campaigns accordingly.

In a preferred embodiment, the fee module 57d may calculate a fee be based on the verified contractor profile and marketer's campaign profile, wherein a suggested fee or commission is calculated for each campaign. Fee calculation factors may be any one of, or combination of, contractor transaction history, exposure history, prospective exposure, display surface type, marketer brand goodwill, marketer product goodwill, etc. Alternatively, fees may be a fixed amount regardless of marketing campaign and, or contractor profile/prospectus. For instance, the exchange platform may keep 3-5% of full transaction fee as a cost of facilitating the transaction between contractor and marketer. Based on this example, the contractor would retain 95-97% of the transaction fee for rendering the agreed upon marketing-based service. Marketer or contractor may accept, reject, or make counter-offer (with a maximum number to facilitate the transaction). Preferably, upon mutual fee/commission agreement, both parties will utilize the DRMEP to disburse and receive funds. Alternatively, other micro-payment services may be linked to the DRMEP for facilitating disbursal and receipt of funds.

The matching module 57a may input and save information of contractor, and, or marketer in the memory; associate each of one or more contractors with one or more marketers in the memory; receive a marketing request from a requesting marketer; determine if a contractor satisfies exposure criteria based on the contractor input; receive a marketing request from a requesting marketer; and if acceptance is confirmed by the requested contractor, store the digital content in the secured location on the server. Upon the completion of campaign agreement, the contractor will be provided with the link and login information for manual retrieval or automatic transfer of digital content to his/her Digit-Roll Display Unit. In other embodiments, marketer may send the marketing request via the server with instructions for delivery and, or pick-up of the digital roll display unit to the requested contractor device.

The matching module 57a may be in operable communication to any one of, or combination of, a tracking module 57b, analytical module 57c, and the fee module 57d to inform said matching module for matching the marketing request to the contractor input above a pre-defined threshold. Contractor input may further comprise any one of, or combination of, a unit track-able data, contractor contextual data, contractor usage history, route data, route contextual data, and, or route historical data.

In a preferred embodiment, the matching module 57a may function as follows: a prospective contractor (prospect) fills out a personal profile form via web-based, desktop or mobile application with his/her driving habit, route, duration, place of work/business/residency, or device placement location, and other relevant information. The preliminary prospect profile is stored onto the DRMEP and, or other remote server, etc. The prospect will also activate the geo-tracking and data exchange function of the Digit-Roll Marketing Unit (DRDU) to enable the tracking capability of the device. The DRMU will track the relevant information (driving route, etc) for a set data-gathering period (7-14 days or longer, for example).

Data are stored onto any one of, or combination of, the DRMEP server, remote server, cloud-based server, and, or non-native servers in real-time. Based on the static data, (personal data) and dynamic data (location tracking), DRMEP will retrieve demographic, consumer habits, and other marketing data from the Internet and other data mining systems. After the data-gathering period, the tracked data, prospect input, and data mining information are combined into a verified prospective contractor profile onto the DRMEP. Unique DRDU Mac ID, contractor ID, bar code, and QR codes are generated for each contractor. A marketer can start an ad hoc or ongoing marketing campaign by completing a campaign profile and criteria such as targeted demographic, duration of campaign, frequency of display, etc. The marketing digital content is then uploaded. These all can be done via web-based, desktop, or mobile apps connected to the DRMEP The marketer can select either self-directed or auto-directed campaign. Unique marketer ID, bar code, and QR codes are generated for each marketer. In a self-directed campaign, A curated archive of contractors is generated by ID, bar code, or QR code and provided. The marketer will select which contractors and will manage different factors of the campaign such as frequency, duration, content quality, etc., for each contractor. In auto-directed campaign, DRMEP will handle all aspects based on the marketer's campaign requirement. Regardless, whether the marketer selects self-directed or auto-directed, all communication may be done via DRMEP. Alternatively, contractor and marketer are permitted to have direct contact with each other to facilitate a transaction, obviating the use of a fee 57*d* and, or transaction module.

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "and, or" as used in this specification and the appended claims is not meant to be exclusive, rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple", "coupled", "coupling", or any variation thereof, as used in this specification and the appended claims refers to either an indirect or direct connection between the identified elements, components or objects. Often the manner of the coupling will be related specifically to the manner in which the two coupled elements interact. Specifically, this term may be used to define tow elements joined by a bolted fastener, a latch, a hook, or any other reasonably readily removable fastening device.

The invention claimed is:

1. An attachable digital signage apparatus specific to a marketer comprising:
at least one housing member with a roller rotationally disposed within, wherein a terminal end of the roller is affixed to any one of a mechanical or electro-mechanical rotational means;
any one of roll-able silicone and, or polymer sheet encasing at least one programmable light emitting diode strip for causing text, graphical, and, or video display, wherein a partial or entire length of said sheet, in a retracted state, is rolled around the roller, such that the sheet is disposed entirely or substantially within the housing member and the partial or entire length of said sheet is extended from the housing member by rotating the roller in a counter directional manner from the retracted state the entire width of said sheet extending from one terminal end of the roller to a second terminal end of the roller;
a control circuit with programmable logic disposed within and, or on the surface of the at least one housing member display of content via the encased light-emitting diodes in any one of a dynamic, scheduled or static fashion, wherein the content is a stored file associated with a specific marketer matched to a user based on the user's current exposure profile and the marketers exposure criteria;
pick-up information of the marketer-specific digital signage pushed to a user matched to the marketer based on an exposure profile of the user and exposure criteria of the marketer; and
upon approval of a physical inspection of the user vehicle and marketers digital signage, attach the digital signage to any one of a plurality of surfaces of the vehicle to perform a display obligation and detaching the digital signage for drop-off to the marketer upon completion of the display obligation.

2. The digital signage of claim 1, comprising at least one connection port at any one of a side of the first housing member for configuring into a multi-unit universally mountable digital signage by connecting to a complementary implement at an opposing panel of a second housing member.

3. The digital signage of claim 1, comprising any one of a vertical or horizontal housing member with a roller rotationally disposed within, wherein each terminal end of the roller is affixed to any one of a mechanical or electro-mechanical means.

4. The digital signage of claim 1, wherein a width and length of the housing member is of a dimension to fit on any one of a vehicle door, bumper, window, store- front, home-front, and, or building front.

5. The digital signage of claim 4, wherein any one of, or combination of the housing member and/or the roll-able silicone and, or polymer sheet is further encased in a protective casing.

6. The digital signage of claim 1, further comprising a single or a plurality of sensors embedded and configured to monitor and sense user's position, movement, and environment, as part of a user context, whereby the digital signage adaptively reconfigures based on said user context.

7. The digital signage of claim 6, wherein the user context further comprises data input over a network, from any one of, or combination of, a user mobile device, wearable device, home, Internet of Things, user-defined input history, and web automation service, whereby the digital signage adaptively reconfigures based on said data.

8. The digital signage of claim 6, further comprising a housing disposed with any one of a short-range communication protocol reader configured to detect a proximally subscribing viewer device and to push content, loyalty and/or reward points to the said viewer device.

9. The digital signage of claim 1, further comprising an electromechanical means disposed within the housing member frames, whereby the electromechanical means is configured to actuate a motor to cause protraction and/or retraction of the roll-able sheet disposed with the housing member.

10. A system for a universally attachable and detachable digital signage specific to a marketer comprising:
- a housing member with a roller rotationally disposed within, wherein each terminal end of the roller is affixed to any one of a mechanical or electro-mechanical rotational means;
- any one of roll-able silicone and, or polymer sheet embedded with a plurality of programmable light emitting diode strips for causing text, and, or graphical display, wherein a partial or entire length of said sheet, in a retracted state, is rolled around the roller, such that the sheet is disposed entirely or substantially within the housing member and the partial or entire length of said sheet extending from the housing member by rotating the roller in a counter directional manner from the retracted state, the entire width of said sheet extending from one terminal end of the roller to a second terminal end of the roller;
- a control circuit with programmable logic disposed within the housing member and coupled to a matching module for causing a display of content in any one of a dynamic, scheduled or static fashion, wherein the content is a stored file associated with a specific marketer matched to a user based on the user's current exposure profile and the marketers exposure criteria by the matching module; and
- at least one affixing element disposed on any one side of the housing member adapted to be attachable to any one of a plurality of surfaces of the user's vehicle upon physical pick-up of the digital signage.

11. The system for a digital signage of claim 10, wherein the user exposure profile includes any one of a travel itinerary detail and/or at least one of a past, current, future geo-location.

12. The system for a digital signage of claim 10, further comprising a housing disposed with any one of a short-range communication protocol reader and, or a subscriber detection module configured to detect a proximally subscribing viewer device and to push subscriber targeted content, loyalty and, or reward points to the subscriber viewer device.

* * * * *